United States Patent [19]

Berecz

[11] 4,331,416
[45] May 25, 1982

[54] ARTICLE TRANSFER DEVICE

[75] Inventor: Imre Berecz, El Toro, Calif.

[73] Assignee: Bristol Industries, Brea, Calif.

[21] Appl. No.: 80,983

[22] Filed: Oct. 1, 1979

[51] Int. Cl.$^3$ ............................................. B65G 47/90
[52] U.S. Cl. .................................. 414/226; 10/72 T; 10/76 T; 10/166; 100/218; 414/744 A; 414/729; 414/739; 414/773; 414/758; 414/783; 414/772
[58] Field of Search .................... 414/763, 744 R, 772, 414/773, 783, 754, 730, 732, 735, 225, 226, 744 A, 744 B, 744 C; 100/218; 10/166, 727, 767

[56] References Cited

U.S. PATENT DOCUMENTS

| | | | |
|---|---|---|---|
| 2,224,975 | 12/1940 | McNamara | 414/773 X |
| 2,881,453 | 4/1959 | Kolip | 10/72 R |
| 3,247,532 | 4/1966 | Klooz et al. | 414/773 X |
| 3,718,216 | 2/1973 | Wilson | 414/226 |
| 4,023,393 | 5/1977 | Messerschmidt | 10/72 T X |
| 4,056,198 | 11/1977 | Boserup | 414/773 X |

*Primary Examiner*—Frank E. Werner

[57] ABSTRACT

A transfer device of the opposed finger type is disclosed for transferring an article along an arcuate path of travel between two stations while rotating the article, so that transfer from one station to another is effected while simultaneously turning the article 180 degrees about an axis substantially normal to the path of travel. The transfer device has a subframe with a fixed reaction element mounted thereon and an elongated transfer arm mounted on the subframe in a manner which allows the transfer arm to rotate about its longitudinal axis as well as pivot with respect to the subframe. One end of the transfer arm has a rotating element which is engaged with the fixed reaction element which causes the transfer arm to rotate about its longitudinal axis as the transfer arm pivots. The other end of the transfer arm has grasping elements to hold an article or workpiece as it is transferred from one work station to another by the pivoting action of the transfer arm, the article also being rotated as the transfer arm rotates in response to the engagement of the rotating element with the reaction element. Apparatus is provided to cyclicly pivot the transfer arm and rotate and transfer the article in timed sequence from one work station to another. Transfer arms may be arranged in tandem or ganged configuration for transfer of the article sequentially along a series of stations.

6 Claims, 6 Drawing Figures

ARTICLE TRANSFER DEVICE

FIELD OF THE INVENTION

In many mechanical manufacturing processes, such as sequential operational steps in forming or machining individual articles, each article must be transferred from a prior station to a subsequent station, as the manufacturing progresses through the sequential steps. Manual transfer is obviously impractical and dangerous in most manufacturing environments. This is especially true in punch presses and similar machinery, and in the case of articles in a range of relatively small sizes, such as from one inch to six inches in length. The problem of article transfer in such environments has been approached in conventional machines by use of transfer devices provided with opposing fingers which grasp an individual article to be transferred from one station to the next sequential station. Most contemporary transfer devices employ oscillating mechanism to effect desired movement of the fingers; the fingers may be either spring biased toward a closed position to grasp an article, or may be opened and closed at timed intervals of operation through conventional cams and/or other suitable timing mechanism.

A disadvantage of previously available transfer devices is the total mass of the fingers and supporting structure. This limits the operating speed and increases the cycle time of the basic manufacturing process.

Another disadvantage in certain types of reciprocating manufacturing machines, such as punch presses and cold forging machines, is that the bulk of the transfer device and the path of travel of the article during transfer is of such configuration and magnitude that the reciprocating member must be retracted a substantial distance before actuation of the transfer device. This severely limits the operational speed of the reciprocating machine and increases the cycle time for each finished article produced thereby.

SUMMARY OF THE INVENTION

The invention provides a transfer device which is of relatively small bulk, low in mass, and a short arcuate transfer path of travel from one station to the next. The invention is particularly suited for use in conjunction with a reciprocating forging machine, such as that used in forming articles of steel, or other material having characteristics lending it to cold or hot forming. The invention has been found to have unique utility when used in a nut forming machine, which is also referred to as a nut-former. The invention will be described in that environment.

Figure 1:
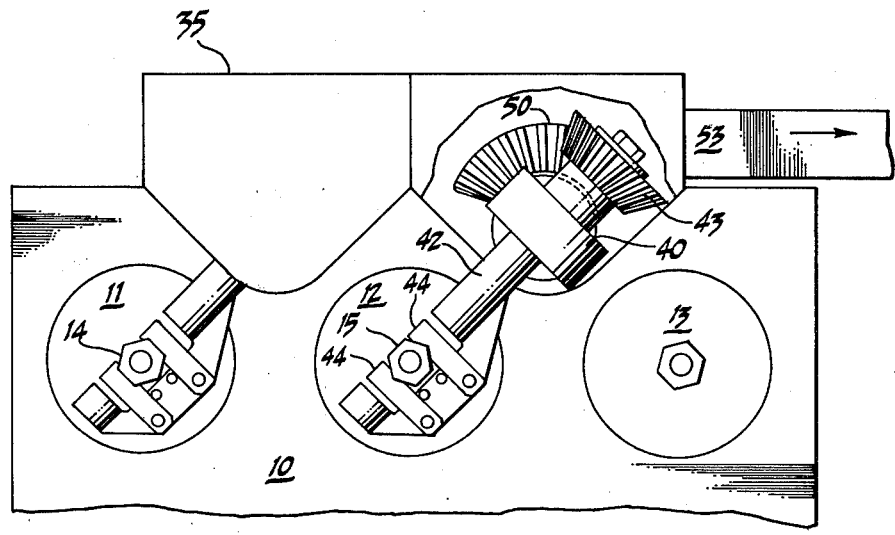
FIG. 1 is a view in front elevation of an article transfer device embodying the present invention and shown in a position mounted on the frame of a nut forming machine fragmentarily illustrated. The transfer device is mounted transversely of the path of travel of a power ram (not shown) on which is carried a plurality of punches which individually cooperate with a respective one of the dies shown.
Figure 2:
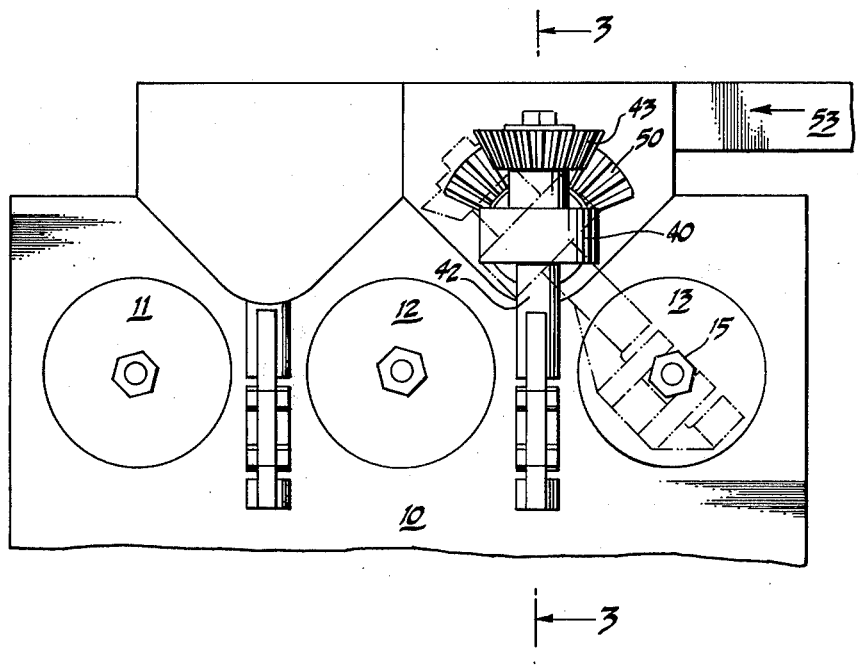
FIG. 2 is a view similar to FIG. 1 in which the transfer device is shown at a position intermediate the limits of its path of travel; the transfer device is shown in dashed lines at its extreme right limit of its path of travel.
Figure 5:
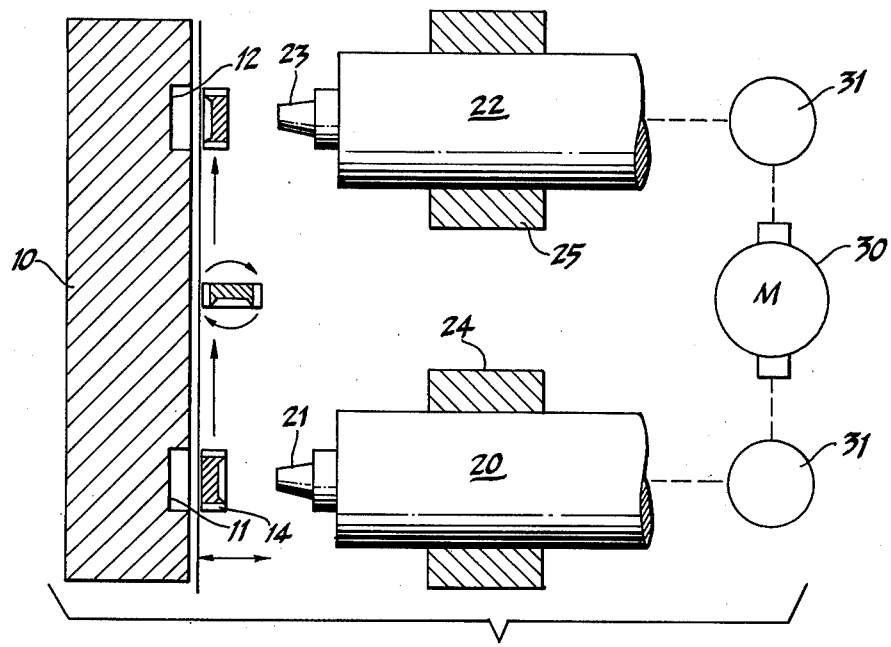
FIG. 5 is a fragmentary cross-section and schematic view of the mechanism of FIG. 1, with a portion of the nut forming machine shown in top plan representation and the path of transfer being in a plane perpendicular to the paper and represented by directional arrows.

Referring first to FIGS. 1 and 2, a main frame 10 of a nut forming machine is fragmentarily illustrated. The frame extends transversely from left to right as viewed and also provides a longitudinal base for a power ram, fragmentarily and schematically illustrated at 20 in FIG. 5. The frame also affords a plurality of transversely spaced work stations in the form of die stations 11, 12, 13. Individual workpiece blanks or articles 14 and 15 are shown, respectively, at die stations 11 and 12. A finishing die is visible at station 13 in FIG. 1. The blank 15 is shown in FIG. 2 as having been transferred to die station 13.

Referring again to FIG. 5, the ram 20 carries a punch 21 at its distal end which is configured and arranged to cooperate with a die at station 11; the details of the punch and die are not essential to the present invention and are not illustrated. A second ram 22 also carries a punch 23 at its distal end for cooperation with a die at station 12. In actual practice the rams 20 and 22 are usually formed of one member; however, they have been illustrated as individual elements to illustrate the reduction in length of stroke of the ram by use of the invention as compared to forging machines provided with previously available transfer devices. Also shown are bearing guides 24 and 25, one for each of the rams 20 and 22 respectively. A main motor 3 serves as a source of power to effect powered extension and retraction of the rams through main crankshaft 31 and conventional power transmission mechanism (not shown), but shown operably interconnected by dashed lines.

Figure 3:
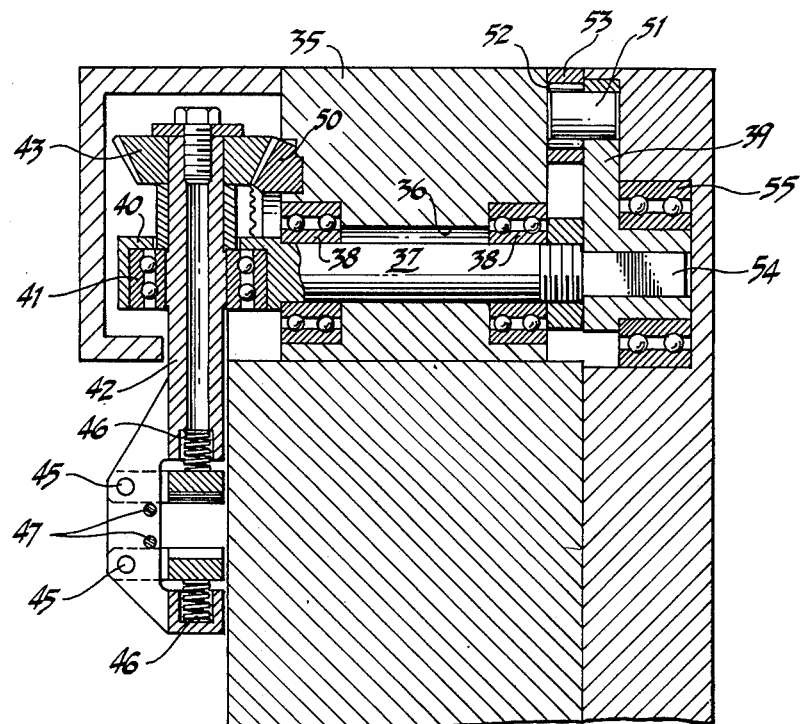
FIG. 3 is a view in vertical section taken on line 3—3 of FIG. 2 in the direction of the arrows.

In FIG. 3 a sub-frame 35 is secured to main frame 10 of the nut former, and is provided with an elongated bore 36. A shaft 37 is rotatably supported in subframe 35 by bearings 38.

Figure 4:
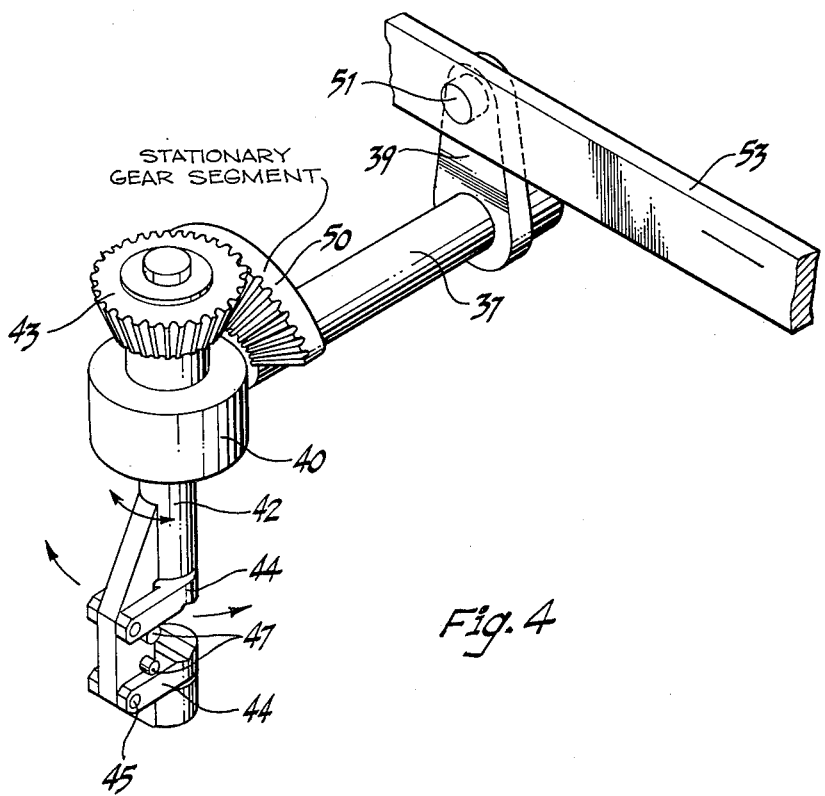
FIG. 4 is a perspective view of the transfer device of FIG. 1, without supporting structure.

A crank arm 39 (FIG. 4) is non-rotatably secured to one end of shaft 37 and a loop type yoke 40 is provided at the opposite end. A bearing 41 (FIG. 3) inside yoke 40 rotatably supports a transfer arm 42. Transfer arm 42 has a longitudinal axis about which it rotates inside yoke 40. Arm 42 carries a bevel gear 43 (FIG. 4) at its upper end and a pair of pivoted opposed fingers or jaws 44 at the lower end which open at right angles to the longitudinal axis of transfer arm 42. The fingers are pivotably mounted on the arm by pins 45 and biased toward a closed position by springs 46 (FIG. 3), which urge the fingers against limit stops 47. The spring biased fingers thereby provide gripping means to grasp and retain a workpiece blank, such as 15, during transfer from one die station to the next successive station.

A stationary gear segment 50 (FIG. 1) is rigidly secured to sub-frame 35 and is thereby fixed in relation to the machine frame 10. Segment 50 is of mating and meshing configuration with gear 43 at the upper end of the transfer arm. A wrist pin 51 (FIG. 4) is rigidly secured at one end to crank arm 39 and is rotatably held at its opposite end by a bearing 52 (FIG. 3) provided in a drag link 53. A flattened end 54 of shaft 37 non-rotatably connects the shaft with crank arm 39. A bearing 55 supports the hub of arm 39 for oscillation relative to the subframe 35. The drag link 53 is connected to crankshaft or bell crank 31 (FIG. 5) by suitable power transmission (not shown) to effect operation of the transfer arm at a desired point in the reciprocal path of travel of the rams 20 and 22.

OPERATION

In operation, the nut former of FIG. 1 is provided with an article or a work piece blank 14 through conventional apparatus (not shown). After full extension of ram 20 and delivery of a forging blow by punch 21, the ram commences retraction under the influence of crankshaft or bell crank 31. At a predetermined point in that retractive movement, the timed power transmission means connected to drag link 53 effects a movement thereof from right-to-left, as viewed in FIG. 4. This causes counterclockwise movement of crank arm 39, and consequent counterclockwise pivoting movement of shaft 37 and yoke 40. Concurrently, gear 43 is rotated by the interaction of stationary segment 50 and counterclockwise movement of yoke 40. Accordingly, transfer arm 42 is subjected to a compound motion in a pivotal pendulum arc, as yoke 40 rotates, and a clockwise rotation about its longitudinal axis (as viewed from the top) due to meshing of gears 43 and stationary segment 50. The net effect is to transfer a workpiece blank from one die station to the next successive station in the sequence of operations. The position of transfer is shown in dashed lines at the right of FIG. 2. The timed power transmission means holds the transfer arm in the position shown in dashed lines until the power ram extends again to a predetermined point in the ram path of travel, at which point the blank 15 is moved out of the biased grasp of the fingers 44 into a position of reception within the die cavity at station 13. As illustrated, the fingers are provided with a grasping profile and contour to accommodate the external configuration of the workpiece blank to force the fingers apart as they contact the workpiece and to insure retention of the blank between the fingers, so as to guide the blank into the die as it is contacted by the punch. It is important to note that the workpiece enters and leaves jaws or fingers 44 at right angles to the longitudinal axis of transfer arm 42. Therefore, the fingers do not need to be moved along the longitudinal axis in order to position them to receive or discharge a workpiece at a die station.

The timed power transmission means then acts upon drag link 53 to move it in a left-to-right direction to the position shown in FIG. 1, thereby returning the transfer arm to its former position wherein the fingers are positioned to receive a workpiece blank as it is ejected from the die cavity at die station 12. Such ejection occurs shortly after retraction of the power ram and punch is commenced.

As soon as the ram and the punch carried thereby has been retracted to a position to permit transverse movement of the blank, the timed power transmission means again moves drag link 53 from right-to-left, as viewed in FIG. 2, thereby effecting a transverse movement of the blank from die station 12 to die station 13.

Figure 6:
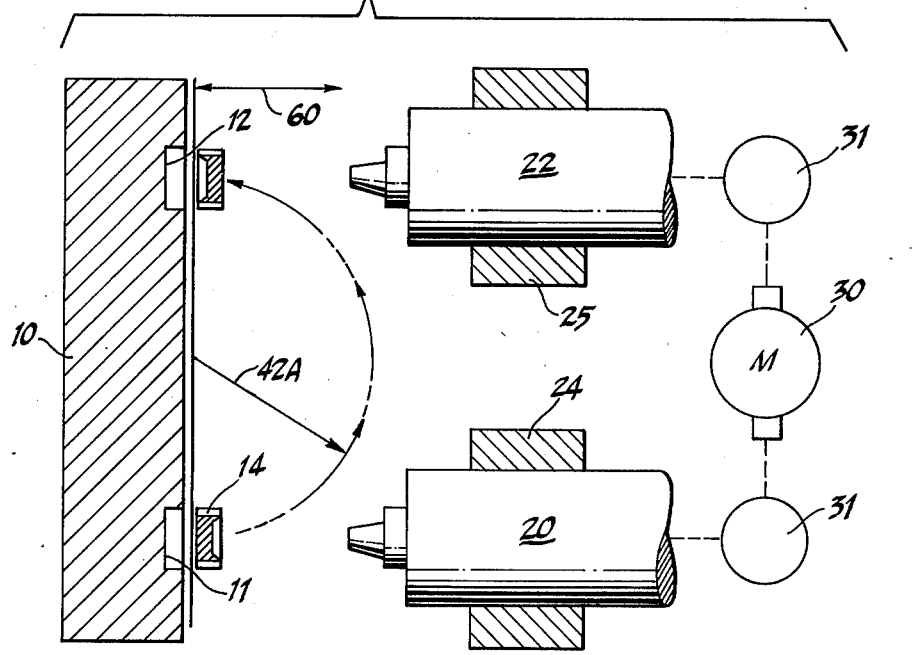
FIG. 6 is a view similar to FIG. 5, but diagrammatically illustrating the semi-circular path of transfer of previously available transfer devices and showing the effect of an increased length of stroke of the punch ram to accommodate the radial transfer path.

It is to be noted that the blank is subjected to a compound motion of translation in a substantially short arcuate path of travel, as well as 180 degrees of rotation due to the rotation of gear 43 on segment 50. Such compound motion permits, at a much earlier point in the ram cycle, the side retreat of the transfer fingers, without delaying transfer motion until after substantial retraction of the punch and ram has occurred. Due to the short dimension of the transfer arm 42, the pendulum arc (as viewed in elevation in FIGS. 1 and 2) is essentially a short arcuate path of travel; as viewed in top plan of FIG. 5, the transfer path of travel of each workpiece blank is in a plane perpendicular to the paper, notwithstanding the 180 degrees of rotation of blank during the course of such travel. This motion is in contrast to existing devices wherein motion is semicircular in the plane as shown in FIG. 6.

By the use of the present invention, the length of ram stroke can be decreased measurably in comparison to the length of stroke of nut formers using previously available transfer devices. This is graphically illustrated by reference to FIG. 6, which schematically shows a nut former using a presently available device; the comparison of a similar nut former using the invention herein graphically shows the decrease in length of operating stroke of the ram. Accordingly, by using a transfer device embodying the present invention an increased rate of production can be achieved. In addition, the decreased bulk and low mass of the transfer device permits operational speeds at a higher rate without inducing inertia loads of great magnitude. By providing a simple mechanical connection to drag link 53, the transfer device can be utilized in a gang arrangement which provides automatic synchronization with all punches at their respective work stations. This also reduces the mass of the operating linkage to permit higher operational rates of production.

In the event that the 180 degrees of rotation of the nut blank is not desired, removal of the gear 43 and securing transfer arm 42 to yoke 40 in a non-rotatable manner by suitable fastening means permits transfer of the nut blank in the same position of orientation from one work station to the next. The transfer is then in a slightly arcuate path of travel lying in a plane normal to the path of travel of the ram path of travel. Since the radius of the transfer (length of arm 42) is quite short, the transfer of the nut blank occurs in a path of travel which is linear from a practical consideration.

It now should be apparent that the present invention provides a mechanical arrangement which may be employed in conjunction with nut forming machines for transferring the nut blank from one station to another while rotating them 180 degrees, the plane of the path of transfer being perpendicular to the stroke axis of the ram thereby reducing the ram stroke from that required by nut forming machines heretofore.

Although particular components, etc., have been discussed in connection with a specific embodiment of a transfer mechanism constructed in accordance with the teachings of the present invention, others may be utilized. Furthermore, it will be understood that although an exemplary embodiment of the present invention has been disclosed and discussed, other applications and mechanical arrangements are possible incorporating the same arcuate and rotational motion and the embodiments disclosed may be subjected to various changes, modifications and substitutions without necessarily departing from the spirit of the invention.

What is claimed is:

1. In a machine having a longitudinally extended frame and a plurality of spaced work stations sequentially arranged along said frame, each station being adapted to receive a workpiece blank therein, a transfer device to effect timed transfer of a workpiece from one station to the next sequential station, the transfer device comprising:

(a) a sub-frame fixedly attached to the machine;

(b) an elongated transfer arm having a longitudinal axis and constructed and adapted to receive in fixed relation thereto grasping means at one end to grasp a workpiece and rotation means at the other end to effect rotation about said longitudinal axis;

(c) a reaction element fixedly secured to said sub-frame and adapted to cooperate with said rotation means;

(d) mounting means for pivotally and rotatably connecting said transfer arm to said sub-frame to permit penduluum swinging of the arm in an arcuate path of travel and rotation about said longitudinal axis and to prevent motion along said longitudinal axis;

(e) driving means to effect cyclic pivotal oscillation of said transfer arm in said arcuate path of travel and concurrent rotation of said transfer arm about said longitudinal axis by the interaction of said rotation means and said fixed reaction element, whereby a workpiece held by grasping means at said one end is moved and rotated in an arcuate transfer path of travel from one work station to the next sequential station; and (f) grasping means fixedly attached to said one end of said elongated transfer arm and having a pair of pivoted opposed jaws which are profiled and contoured to accept a workpiece and to open at right angles to said longitudinal axis when forced apart by a workpiece such that a workpiece enters and leaves said jaws in a direction perpendicular to said longitudinal axis without opening said jaws or adjusting the position thereof along said longitudinal axis.

2. The machine of claim 1 wherein said pair of pivoted opposed jaws further includes biasing means urging them toward a closed position.

3. The machine of claim 1 further including a powered ram supported in the frame for movement in a reciprocal longitudinal path of travel toward and away from said work stations and wherein said mounting means for said transfer arm is arranged to provide said arcuate transfer path of travel of the workpiece in a plane perpendicular to said longitudinal path of ram travel.

4. The machine of claim 3 wherein said driving means is synchronized with ram travel so that cyclic oscillation of said transfer arm commences substantially immediately upon commencement of ram travel away from the work stations and that completion of the transfer of the workpiece along its path of travel is completed prior to completion of ram travel toward the work stations.

5. In a machine having a longitudinally extended frame, a plurality of sequential work stations arranged transversely therein, each being adapted to receive a workpiece, a ram mounted and arranged in the frame for movement in a longitudinal reciprocal path of travel toward and away from said work stations, and power transmission means driven by a source of power to effect powered reciprocal movement of the ram, a combination of a transfer device to effect timed transfer of a workpiece from one station to the next sequential station, the transfer device comprising:

(a) a sub-frame secured to the machine frame;

(b) an elongated transfer arm having a longitudinal axis and provided with a pair of opposed fingers at one end pivotally attached and contoured to accept a workpiece and opening outwardly in a direction perpendicular to said longitudinal axis when forced apart by a workpiece, including means biasing said fingers toward a closed position, thereby defining a workpiece retaining space therebetween;

(c) transfer gear means non-rotatably secured to the other end of the transfer arm;

(d) reaction gear means fixed to the sub-frame in cooperating meshing relation with said transfer gear means;

(e) bearing means for mounting the transfer arm in the sub-frame to permit pivoting of the transfer arm in an arcuate path of travel about said bearing means wherein said opposed fingers move from opposite one work station to opposite an adjacent work station;

(f) operator means secured to the transfer arm intermediate its ends, including bearing means to permit rotation of the arm about said longitudinal axis; and (g) timed power transmission means operably connected between the source of power and the transfer arm operator means to effect cyclic oscillation of the arm in said arcuate path of travel and to effect concurrent rotation of the arm about its axis by the interaction of the transfer gear means and the reaction gear means, whereby a workpiece blank held by the the opposed fingers is moved and rotated in a an arcuate transfer path of travel from work station to the next sequential station.

6. The machine of claim 5 wherein the timed power transmission means causing cyclic oscillation of the transfer arm is synchronized with ram movement so that the fingers are positioned to grasp a workpiece at one station upon commencement of ram travel away from said one station, so that commencement of cyclic oscillation of the transfer arm occurs substantially immediately upon said grasping, and that completion of the transfer of the workpiece along its path of travel to the next sequential station occurs prior to completion of ram travel towards that next station.

* * * * *